(12) United States Patent
Boon et al.

(10) Patent No.: US 10,358,010 B2
(45) Date of Patent: Jul. 23, 2019

(54) INTERLINKED ACTIVE SUSPENSION

(71) Applicant: Tenneco Automotive Operating Company Inc., Lake Forest, IL (US)

(72) Inventors: Peter Boon, Merchtem (BE); Bert Vandersmissen, Lovenjoel (BE); Frank Gommans, Maastricht (BE)

(73) Assignee: TENNECO AUTOMOTIVE OPERATING COMPANY INC., Lake Forestt, IL (US)

( * ) Notice: Subject to any disclaimer, the term of this patent is extended or adjusted under 35 U.S.C. 154(b) by 218 days.

(21) Appl. No.: 15/613,398

(22) Filed: Jun. 5, 2017

(65) Prior Publication Data

US 2018/0345747 A1 Dec. 6, 2018

(51) Int. Cl.
*B60G 17/018* (2006.01)
*B60G 17/033* (2006.01)
(Continued)

(52) U.S. Cl.
CPC ......... *B60G 17/018* (2013.01); *B60G 17/033* (2013.01); *B60G 17/056* (2013.01);
(Continued)

(58) Field of Classification Search
CPC .... B60G 17/018; B60G 17/056; B60G 21/06; B60G 17/033; B60G 2400/70;
(Continued)

(56) References Cited

U.S. PATENT DOCUMENTS 3,559,027 A 1/1971 Arsem
3,861,487 A 1/1975 Gill
(Continued)

FOREIGN PATENT DOCUMENTS

DE 10164635 A1 1/2003
DE 102006058671 A1 3/2008
(Continued)

OTHER PUBLICATIONS

Written Opinion in related PCT application No. PCT/US2018/035866 dated Sep. 20, 2018.
(Continued)

*Primary Examiner* — Darlene P Condra
(74) *Attorney, Agent, or Firm* — Harness, Dickey & Pierce, P.L.C.

(57) ABSTRACT

A vehicle suspension system may include hydraulic actuators, first and second conduits, and first and second switch valves. Each actuator includes a cylinder and a piston that divides an interior of the cylinder into compression and rebound chambers. First and third ports of each cylinder are openings to the rebound chamber. Second and fourth ports of each cylinder are openings to the compression chamber. The first conduit connects the third port of a first actuator with the fourth port of a second actuator. The second conduit fluidly connects the third port of the second actuator with the fourth port of the first actuator. The first switch valve is connected to the first and second ports of the first one of the hydraulic actuators. The second switch valve is connected to the first and second ports of the second one of the hydraulic actuators.

20 Claims, 11 Drawing Sheets

(51) Int. Cl.
*B60G 21/06* (2006.01)
*B60G 17/056* (2006.01)

(52) U.S. Cl.
CPC ........ *B60G 21/06* (2013.01); *B60G 2400/102* (2013.01); *B60G 2400/202* (2013.01); *B60G 2400/252* (2013.01); *B60G 2400/5122* (2013.01); *B60G 2400/70* (2013.01)

(58) Field of Classification Search
CPC ...... B60G 2400/5122; B60G 2400/252; B60G 2400/202; B60G 2400/102
USPC ...................... 280/124.16, 124.159, 124.161
See application file for complete search history.

(56) References Cited

U.S. PATENT DOCUMENTS

| | | | |
|---|---|---|---|
| 3,893,702 A | 7/1975 | Keijzer et al. | |
| 3,917,309 A | 11/1975 | Hegel et al. | |
| 3,921,746 A | 11/1975 | Lewus | |
| 3,954,256 A | 5/1976 | Keijzer et al. | |
| 3,979,134 A | 9/1976 | Keijzer et al. | |
| 4,270,771 A * | 6/1981 | Fujii | B60G 17/033 267/64.19 |
| 4,381,041 A | 4/1983 | Butoi | |
| 4,613,153 A * | 9/1986 | Shibahata | B60G 17/0277 280/5.507 |
| 4,743,046 A | 5/1988 | Schnittger | |
| 4,747,615 A | 5/1988 | Yamamoto | |
| 4,770,438 A | 9/1988 | Sugasawa et al. | |
| 4,809,179 A | 2/1989 | Klinger et al. | |
| 4,825,370 A | 4/1989 | Kurosawa | |
| 4,881,172 A | 11/1989 | Miller | |
| 4,907,154 A | 3/1990 | Yasuda et al. | |
| 4,919,440 A | 4/1990 | Tsukamoto | |
| 4,936,423 A | 6/1990 | Karnopp | |
| 4,967,360 A | 10/1990 | Fukunaga et al. | |
| 4,970,645 A | 11/1990 | Adachi et al. | |
| 4,975,849 A | 12/1990 | Ema | |
| 5,082,308 A | 1/1992 | Jones | |
| 5,097,419 A | 3/1992 | Lizell | |
| 5,102,161 A | 4/1992 | Williams | |
| 5,193,845 A | 3/1993 | Yokote et al. | |
| 5,215,327 A | 6/1993 | Gatter et al. | |
| 5,219,152 A | 6/1993 | Derrien et al. | |
| 5,222,759 A | 6/1993 | Wanner et al. | |
| 5,231,583 A | 7/1993 | Lizell | |
| 5,269,556 A | 12/1993 | Heyring | |
| 5,372,378 A | 12/1994 | Seufert | |
| 5,398,788 A | 3/1995 | Lizell | |
| 5,447,332 A | 9/1995 | Heyring et al. | |
| 5,475,593 A | 12/1995 | Townend | |
| 5,480,188 A | 1/1996 | Heyring et al. | |
| 5,556,115 A | 9/1996 | Heyring | |
| 5,562,305 A | 10/1996 | Heyring et al. | |
| 5,601,306 A | 2/1997 | Heyring et al. | |
| 5,601,307 A | 2/1997 | Heyring et al. | |
| 5,682,980 A | 11/1997 | Reybrouck | |
| 5,725,239 A | 3/1998 | de Molina | |
| 5,785,344 A | 7/1998 | Vandewal et al. | |
| 5,794,966 A | 8/1998 | MacLeod | |
| 5,839,741 A | 11/1998 | Heyring | |
| 5,915,701 A | 6/1999 | Heyring | |
| 5,934,422 A | 8/1999 | Steed | |
| 6,010,139 A | 1/2000 | Heyring et al. | |
| 6,111,375 A | 8/2000 | Zenobi et al. | |
| 6,217,047 B1 | 4/2001 | Heyring et al. | |
| 6,220,613 B1 | 4/2001 | Franzini | |
| 6,270,098 B1 | 8/2001 | Heyring et al. | |
| 6,318,742 B2 | 11/2001 | Franzini | |
| 6,338,014 B2 | 1/2002 | Heyring et al. | |
| 6,519,517 B1 | 2/2003 | Heyring et al. | |
| 6,588,777 B1 | 7/2003 | Heyring | |
| 6,669,208 B1 | 12/2003 | Monk et al. | |
| 6,761,371 B1 | 7/2004 | Heyring et al. | |
| 7,040,631 B2 | 5/2006 | Kotulla et al. | |
| 7,321,816 B2 | 1/2008 | Lauwerys et al. | |
| 7,350,793 B2 | 4/2008 | Munday | |
| 7,384,054 B2 | 6/2008 | Heyring et al. | |
| 7,386,378 B2 | 6/2008 | Lauwerys et al. | |
| 7,611,152 B2 * | 11/2009 | van der Knaap | B60G 17/0152 280/124.106 |
| 7,637,513 B2 | 12/2009 | Kotulla et al. | |
| 7,641,208 B1 * | 1/2010 | Barron | B60G 21/0556 280/124.106 |
| 7,686,309 B2 | 3/2010 | Munday et al. | |
| 7,751,959 B2 | 7/2010 | Boon et al. | |
| 7,789,398 B2 | 9/2010 | Munday et al. | |
| 8,672,337 B2 * | 3/2014 | van der Knaap | B60G 17/0152 280/124.106 |
| 8,820,064 B2 | 9/2014 | Six et al. | |
| 8,966,889 B2 | 3/2015 | Six | |
| 9,108,484 B2 | 8/2015 | Reybrouck | |
| 9,481,221 B2 | 11/2016 | Reybrouck | |
| 2004/0113377 A1 | 6/2004 | Klees | |
| 2005/0252699 A1 | 11/2005 | Schedgick et al. | |
| 2006/0181034 A1 | 8/2006 | Wilde et al. | |
| 2007/0089924 A1 | 4/2007 | de la Torre et al. | |
| 2008/0129000 A1 | 6/2008 | Munday et al. | |
| 2008/0257626 A1 | 10/2008 | Carabelli et al. | |
| 2008/0309045 A1 * | 12/2008 | Johnson, Jr. | B60G 13/14 280/124.161 |
| 2009/0166989 A1 | 7/2009 | Atsushi | |
| 2009/0192674 A1 | 7/2009 | Simons | |
| 2009/0260935 A1 | 10/2009 | Avadhany et al. | |
| 2010/0006362 A1 | 1/2010 | Armstrong | |
| 2010/0072760 A1 | 3/2010 | Anderson et al. | |
| 2011/0074123 A1 | 3/2011 | Fought et al. | |
| 2011/0187065 A1 | 8/2011 | Van Der Knaap et al. | |
| 2011/0302914 A1 | 12/2011 | Helbling | |
| 2012/0049470 A1 | 3/2012 | Rositch et al. | |
| 2014/0190156 A1 | 7/2014 | Reybrouck | |
| 2015/0152888 A1 | 6/2015 | Six | |
| 2018/0298587 A1 * | 10/2018 | Kim | E02F 9/20 |

FOREIGN PATENT DOCUMENTS

| | | |
|---|---|---|
| DE | 102010007237 A1 | 9/2010 |
| EP | 0858918 A1 | 8/1998 |
| EP | 1878598 A1 | 1/2008 |
| JP | 2007001570 A | 1/2007 |
| KR | 20010011034 A | 2/2001 |
| KR | 20090059260 A | 6/2009 |
| WO | 9523076 A1 | 8/1995 |
| WO | 9818641 A1 | 5/1998 |
| WO | 2004030955 A1 | 4/2004 |
| WO | 2008005667 A2 | 1/2008 |
| WO | 2012173687 A1 | 12/2012 |

OTHER PUBLICATIONS

ISR issued in related PCT Application No. PCT/US2018/035866 dated Sep. 20, 2018.
Kennes, et al., Performance of the Tenneco Automotive / Ohlins Racing CES Semi-Active Suspension System, Nov. 25, 2003.

* cited by examiner

INTERLINKED ACTIVE SUSPENSION

FIELD

The present disclosure relates to an interlinked active suspension for a vehicle.

BACKGROUND

This section provides background information related to the present disclosure and is not necessarily prior art.

Suspension systems are provided to filter or isolate the vehicle's body (sprung portion) from the vehicle's wheels and axles (unsprung portion) when the vehicle travels over vertical road surface irregularities (e.g., bumps in the road) as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to the sprung portion or body of the vehicle through a piston rod. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems can generate variable damping forces during rebound and compression movements of the hydraulic actuator regardless of the position and movement of the piston in the pressure tube.

The movement produced in the hydraulic actuators in both the passive, semi-active and active suspension systems generates energy and this energy is dissipated into heat of the hydraulic actuator's fluid and the components of the actuator.

SUMMARY

This section provides a general summary of the disclosure, and is not a comprehensive disclosure of its full scope or all of its features.

In one form, the present disclosure provides a vehicle suspension system that may include a plurality of hydraulic actuators, a first conduit, a second conduit, a third conduit, a first valve (e.g., a comfort valve), a second valve (e.g., a comfort valve), and a third valve (e.g., a switch valve). Each of the plurality of hydraulic actuators including a cylinder and a piston movable within the cylinder. The piston dividing an interior of the cylinder into a compression chamber and a rebound chamber. The compression and rebound chambers contain hydraulic fluid. Each of the cylinders may include a first port, a second port, a third port, and a fourth port. The first and third ports are openings to the rebound chamber, and the second and fourth ports are openings to the compression chamber. The first conduit may fluidly connect the rebound chamber of a first one of the plurality of hydraulic actuators with the compression chamber of a second one of the plurality of hydraulic actuators. The second conduit may fluidly connect the rebound chamber of the second one of the plurality of hydraulic actuators with the compression chamber of the first one of the plurality of hydraulic actuators. The third conduit may extend from the first conduit to the second conduit and may be in selective fluid communication with the first and second conduits. The first valve may be connected to the first and third conduits and may be movable between an open position allowing fluid communication between the first and third conduits and a closed position restricting fluid communication between the first and third conduits. The second valve may be connected to the second and third conduits and may be movable between an open position allowing fluid communication between the second and third conduits and a closed position restricting fluid communication between the second and third conduits. The third valve may be connected to the first and second ports of the first one of the plurality of hydraulic actuators and may be movable between a first position allowing fluid flow into the first port of the first one of the plurality of hydraulic actuators and a second position allowing fluid flow into the second port of the first one of the plurality of hydraulic actuators.

In some configurations, the vehicle suspension system includes a pump in fluid communication with the third valve and pumping hydraulic fluid through the third valve to a selected one of the first and second ports of the first one of the plurality of hydraulic actuators.

In some configurations, the vehicle suspension system includes a control module in communication with the pump and operable in a performance mode and in an economy mode. The control module may operate the pump in the performance mode and may shut down the pump in the economy mode.

In some configurations, the vehicle suspension system includes a pressure maintenance unit providing hydraulic fluid to the pump and to the third conduit. The pressure maintenance unit may include a reservoir containing hydraulic fluid and another pump pumping hydraulic fluid from the reservoir.

In some configurations, the vehicle suspension system includes a fourth valve (e.g., a switch valve) connected to the first and second ports of the second one of the plurality of hydraulic actuators and movable between a first position allowing fluid flow into the first port of the second one of the plurality of hydraulic actuators and a second position allowing fluid flow into the second port of the second one of the plurality of hydraulic actuators.

In some configurations, the pump is in fluid communication with the fourth valve and pumps hydraulic fluid through the fourth valve to a selected one of the first and second ports of the second one of the plurality of hydraulic actuators.

In some configurations, the vehicle suspension system includes another pump in fluid communication with the fourth valve and pumping hydraulic fluid through the fourth valve to a selected one of the first and second ports of the second one of the plurality of hydraulic actuators.

In some configurations, the vehicle suspension system includes a first accumulator in direct fluid communication with the first conduit.

In some configurations, the vehicle suspension system includes a second accumulator in direct fluid communication with the second conduit.

In some configurations, the vehicle suspension system includes a buffer accumulator in fluid communication with the third conduit.

In some configurations, the vehicle suspension system includes a control module in communication with the first and second valves.

In some configurations, the control module opens the first valve and closes the second valve in response to a vehicle turn in a first direction, whereby the piston of the first one of the plurality of hydraulic actuators moves in a compression stroke and the piston of the second one of the plurality of hydraulic actuators moves in a rebound stroke.

In some configurations, the control module opens the second valve and closes the first valve in response to a vehicle turn in a second direction, whereby the piston of the first one of the plurality of hydraulic actuators moves in a rebound stroke and the piston of the second one of the plurality of hydraulic actuators moves in a compression stroke.

In some configurations, the control module opens the first and second valves during straight-line driving.

In another form, the present disclosure provides a vehicle suspension system that may include a plurality of hydraulic actuators, a first conduit, a second conduit, a first switch valve, and a second switch valve. Each of the plurality of hydraulic actuators includes a cylinder and a piston movable within the cylinder. The piston divides an interior of the cylinder into a compression chamber and a rebound chamber. The compression and rebound chambers contain hydraulic fluid. Each of the cylinders includes a first port, a second port, a third port, and a fourth port. The first and third ports are openings to the rebound chamber, and the second and fourth ports are openings to the compression chamber. The first conduit may fluidly connect the third port of a first one of the plurality of hydraulic actuators with the fourth port of a second one of the plurality of hydraulic actuators. The second conduit may fluidly connect the third port of the second one of the plurality of hydraulic actuators with the fourth port of the first one of the plurality of hydraulic actuators. The first switch valve may be connected to the first and second ports of the first one of the plurality of hydraulic actuators and may be movable between a first position allowing fluid flow into the first port of the first one of the plurality of hydraulic actuators and a second position allowing fluid flow into the second port of the first one of the plurality of hydraulic actuators. The second switch valve may be connected to the first and second ports of the second one of the plurality of hydraulic actuators and may be movable between a first position allowing fluid flow into the first port of the second one of the plurality of hydraulic actuators and a second position allowing fluid flow into the second port of the second one of the plurality of hydraulic actuators.

In some configurations, the vehicle suspension system includes a pump in fluid communication with the first switch valve and pumping hydraulic fluid through the first switch valve to a selected one of the first and second ports of the first one of the plurality of hydraulic actuators.

In some configurations, the vehicle suspension system includes a control module in communication with the pump and operable in a performance mode and in an economy mode. The control module may operate the pump in the performance mode and may shut down the pump in the economy mode.

In some configurations, the vehicle suspension system includes a first accumulator and a second accumulator. The first accumulator may be in direct or indirect fluid communication with the first conduit. The second accumulator may be in direct or indirect fluid communication with the second conduit.

In some configurations, the vehicle suspension system includes a third conduit extending from the first conduit to the second conduit and in selective fluid communication with the first and second conduits.

In some configurations, the vehicle suspension system includes a buffer accumulator in fluid communication with the third conduit and the pump.

In some configurations, the pump is in fluid communication with the second switch valve and pumps hydraulic fluid through the second switch valve to a selected one of the first and second ports of the second one of the plurality of hydraulic actuators.

In some configurations, the vehicle suspension system includes another pump in fluid communication with the second switch valve and pumping hydraulic fluid through the second switch valve to a selected one of the first and second ports of the second one of the plurality of hydraulic actuators.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
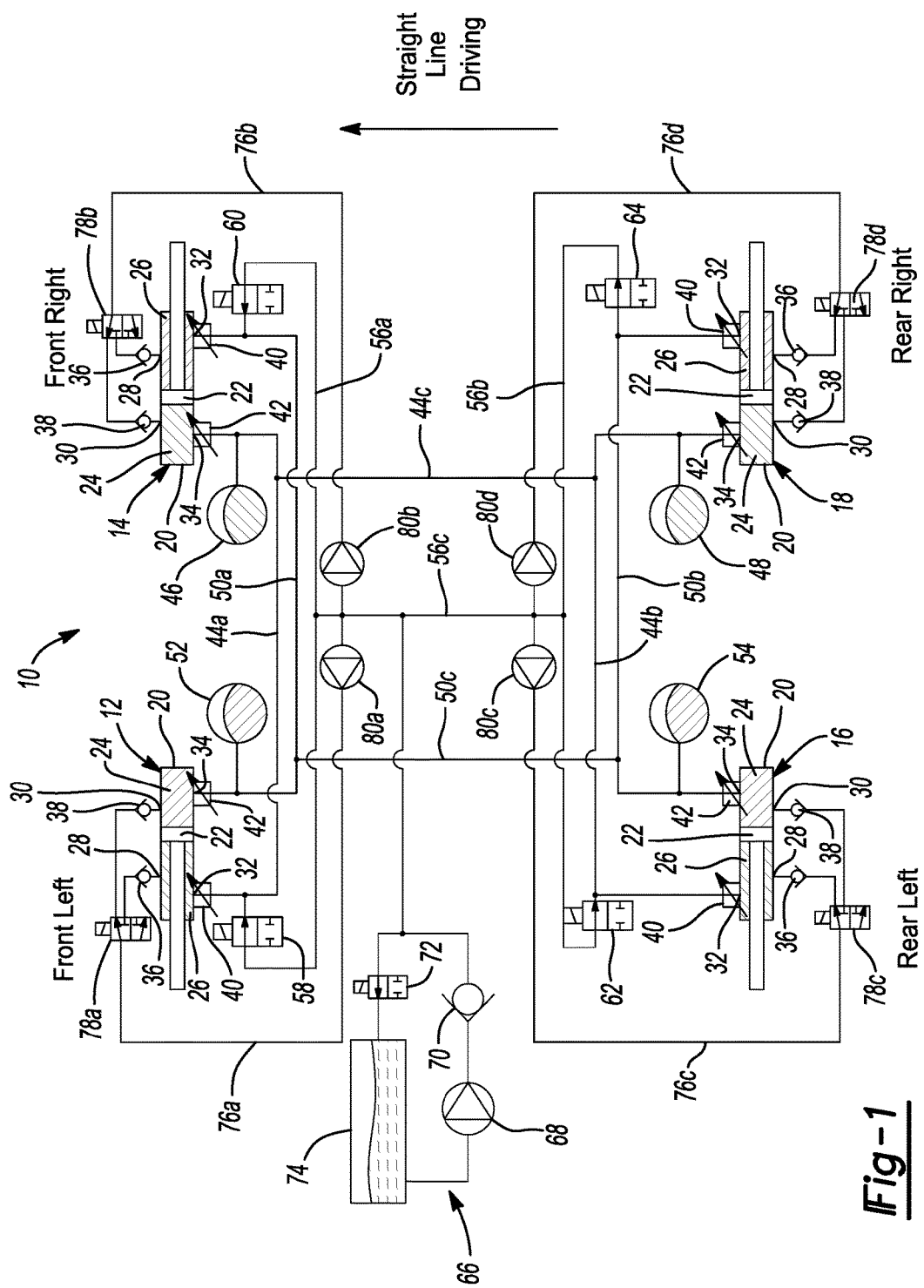
FIG. 1 is a schematic representation of a suspension system in a performance mode while a vehicle in which the suspension system is installed is driving straight.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-7, a suspension system 10 is provided that can be incorporated into a vehicle. The system 10 includes a hydraulic circuit having a plurality of hydraulic actuators including a front-left actuator (or damper) 12, a front-right actuator (or damper) 14, a rear-left actuator (or damper) 16, and a rear-right actuator (or damper) 18. A front axle of the vehicle may be attached to a body of the vehicle by the front-left and front-right actuators 12, 14. Similarly, a rear axle of the vehicle may be attached to the body of the vehicle by the rear-left and rear-right actuators 16, 18. The hydraulic actuators 12, 14, 16, 18 serve to dampen the relative motion of the unsprung portion of the vehicle (i.e., the front and rear axles and wheels) with respect to the sprung portion of the vehicle (i.e., the body). Sensors (not shown) may be disposed at each wheel of the front and rear axles to sense the position and/or the velocity and/or the acceleration of the body and/or wheels. In some configurations, the hydraulic actuators 12, 14, 16, 18 may be CVSA or CVSA2 dampers manufactured by Tenneco Automotive Operating Company, Inc. Other types and/or models of actuators could also be employed. While the system 10 shown in the figures is for a vehicle having two axles, the principles of the present disclosure are applicable to vehicles having more than two axles.

Each of the hydraulic actuators 12, 14, 16, 18 may include a cylinder 20 and a piston 22. The piston 22 is movable within an interior volume of the cylinder 20. The piston 22 divides the interior volume of the cylinder 20 into a compression chamber 24 and a rebound chamber 26. The compression and rebound chambers 24, 26 contain hydraulic fluid (e.g., oil) that dampens movement of the piston 22 within the cylinder 20. Each of the cylinders 20 may include a first opening or port 28, a second opening or port 30, a third opening or port 32, and fourth opening or port 34. The first and third ports 28, 32 of each cylinder 20 are in fluid communication with the rebound chamber 26 of the respective cylinder 20. The second and fourth ports 30, 34 of each cylinder 20 are in fluid communication with the compression chamber 24 of the respective cylinder 20.

A first check valve 36 is disposed at or adjacent each of the first ports 28. The first check valves 36 allow fluid flow into the rebound chambers 26 through the respective first ports 28 and restrict or prevent fluid flow out of the rebound chambers 26 through the respective first ports 28. A second check valve 38 is disposed at or adjacent each of the second ports 30. The second check valves 38 allow fluid flow into the compression chambers 24 through the respective second ports 30 and restrict or prevent fluid flow out of the compression chambers 24 through the respective second ports 30.

A first control valve 40 is disposed at or adjacent each of the third ports 32. The first control valves 40 may be electronically adjusted to control fluid flow into and out of the rebound chambers 26 through the respective third ports 32. A second control valve 42 is disposed at or adjacent each of the fourth ports 34. The second control valves 42 may be electronically adjusted to control fluid flow into and out of the compression chambers 24 through the respective fourth ports 34. The first and second control valves 40, 42 may be solenoid valves, stepper valves, or any other suitable electromechanical valve.

A conduit 44a may extend between and fluidly communicate with the third port 32 of the front-left actuator 12 and the fourth port 34 of the front-right actuator 14. That is, the conduit 44a provides fluid communication between the rebound chamber 26 of the front-left actuator 12 and the compression chamber 24 of the front-right actuator 14. The first control valve 40 of the front-left actuator 12 controls the flow of fluid between the conduit 44a and the rebound chamber 26 of the front-left actuator 12. The second control valve 42 of the front-right actuator 14 controls the flow of fluid between the conduit 44a and the compression chamber 24 of the front-right actuator 14. An accumulator (e.g., a multi-layer membrane accumulator) 46 containing hydraulic fluid may be fluidly coupled to the conduit 44a.

A conduit 44b may extend between and fluidly communicate with the third port 32 of the rear-left actuator 16 and the fourth port 34 of the rear-right actuator 18. That is, the conduit 44b provides fluid communication between the rebound chamber 26 of the rear-left actuator 16 and the compression chamber 24 of the rear-right actuator 18. The first control valve 40 of the rear-left actuator 16 controls the flow of fluid between the conduit 44b and the rebound chamber 26 of the rear-left actuator 16. The second control valve 42 of the rear-right actuator 18 controls the flow of fluid between the conduit 44b and the compression chamber 24 of the rear-right actuator 18. An accumulator (e.g., a multi-layer membrane accumulator) 48 containing hydraulic fluid may be fluidly coupled to the conduit 44b. The conduits 44a, 44b are fluidly connected to each other by a conduit 44c.

A conduit 50a may extend between and fluidly communicate with the fourth port 34 of the front-left actuator 12 and the third port 32 of the front-right actuator 14. That is, the conduit 50a provides fluid communication between the compression chamber 24 of the front-left actuator 12 and the rebound chamber 26 of the front-right actuator 14. The second control valve 42 of the front-left actuator 12 controls the flow of fluid between the conduit 50a and the compression chamber 24 of the front-left actuator 12. The first control valve 40 of the front-right actuator 14 controls the flow of fluid between the conduit 50a and the rebound chamber 26 of the front-right actuator 14. An accumulator (e.g., a multi-layer membrane accumulator) 52 containing hydraulic fluid may be fluidly coupled to the conduit 50a.

A conduit 50b may extend between and fluidly communicate with the fourth port 34 of the rear-left actuator 16 and the third port 32 of the rear-right actuator 18. That is, the conduit 50b provides fluid communication between the compression chamber 24 of the rear-left actuator 16 and the rebound chamber 26 of the rear-right actuator 18. The second control valve 42 of the rear-left actuator 16 controls the flow of fluid between the conduit 50b and the compression chamber 24 of the rear-left actuator 16. The first control valve 40 of the rear-right actuator 18 controls the flow of fluid between the conduit 50b and the rebound chamber 26 of the rear-right actuator 18. An accumulator (e.g., a multi-layer membrane accumulator) 54 containing hydraulic fluid may be fluidly coupled to the conduit 50b. The conduits 50a, 50b are fluidly connected to each other by a conduit 50c.

A conduit 56a may extend between and selectively communicate with the conduit 44a and the conduit 50a. A first comfort valve 58 may be disposed along the conduit 56a and may control fluid communication between the conduit 56a and the conduit 44a. A second comfort valve 60 may be disposed along the conduit 56a and may control fluid communication between the conduit 56a and the conduit 50a.

A conduit 56b may extend between and selectively communicate with the conduit 44b and the conduit 50b. A third comfort valve 62 may be disposed along the conduit 56b and may control fluid communication between the conduit 56b and the conduit 44b. A fourth comfort valve 64 may be disposed along the conduit 56b and may control fluid communication between the conduit 56b and the conduit 50b. The conduits 56a, 56b are fluidly connected to each other by a conduit 56c. The comfort valves 58, 60, 62, 64 may be low-restriction on-off valves such as solenoid valves, for example.

An automatic pressure maintenance unit (APMU) 66 may be fluidly connected to the conduit 56c. The APMU 66 may be a fluid circuit including a pump 68, a check valve 70, a seat valve 72, and a reservoir 74. The reservoir 74 may contain a volume of hydraulic fluid. Operation of the pump 68 draws hydraulic fluid from the reservoir 74 and pumps the hydraulic fluid through the check valve 70 and into the conduit 56c to increase the static fluid pressure in the system 10 to vary roll stiffness of the system 10 and/or to compensate for fluctuations in the temperature of the hydraulic fluid. The seat valve 72 may be a solenoid valve, for example, and may selectively open and close to control the amount of hydraulic fluid that is able to return to the reservoir 74. In some configurations, a pressure-relief valve may be disposed between the pump 68 and the check valve 70. In some configurations, a pressure sensor may sense fluid pressure within the APMU 66. Control of the pump 68 and/or the seat valve 72 may be at least partially based upon such fluid pressure data. In some configurations, the APMU 66 may include two seat valves, one of which controls fluid communication between the APMU 66 and the conduit 56a, and the other of which controls fluid communication between the APMU 66 and the conduit 56b.

Conduits 76a, 76b, 76c, 76d may also be fluid connected to the conduit 56c. Each conduit 76a, 76b, 76c, 76d may include a respective switch valve 78a, 78b, 78c, 78d. Each switch valve 78a, 78b, 78c, 78d is fluidly coupled to the first and second ports 28, 30 of a respective one of the actuators 12, 14, 16, 18. Each switch valve 78a, 78b, 78c, 78d is movable between a first position allowing fluid communication between the respective conduit 76a, 76b, 76c, 76d and the rebound chamber 26 (via the first port 28) of the respective actuator 12, 14, 16, 18 and preventing fluid communication between the respective conduit 76a, 76b, 76c, 76d and the compression chamber 24 (via the second port 30) of the respective actuator 12, 14, 16, 18; a second position allowing fluid communication between the respective conduit 76a, 76b, 76c, 76d and the compression chamber 24 (via the second port 30) of the respective actuator 12, 14, 16, 18 and preventing fluid communication between the respective conduit 76a, 76b, 76c, 76d and the rebound chamber 26 (via the first port 28) of the respective actuator 12, 14, 16, 18; and a third position preventing the respective conduit 76a, 76b, 76c, 76d from fluidly communicating with either of the chambers 24, 26 (via the first and second ports 28, 30). Pumps 80a, 80b, 80c, 80d may be disposed along or fluidly connected to conduits 76a, 76b, 76c, 76d, respectively. The pumps 80a, 80b, 80c, 80d can be operated to pump hydraulic fluid from the conduit 56c through a respective one of the conduits 76a, 76b, 76c, 76d. Each of the pumps 80a, 80b, 80c, 80d may be powered by its own electric motor, or the pumps 80a, 80b, 80c, 80d can be driven by belts or chains that are driven by an engine or powertrain of the vehicle.

A control module 82 (FIG. 7) may be in wired or wireless communication with the pumps 68, 80a, 80b, 80c, 80d and the valves 40, 42, 58, 60, 62, 64, 72, 78a, 78b, 78c, 78d. The control module 82 may control operation of the pumps 68, 80a, 80b, 80c, 80d and the valves 40, 42, 58, 60, 62, 64, 72, 78a, 78b, 78c, 78d based on data from a plurality of sensors (e.g., accelerometers, speedometers, pressure sensors, and/or temperature sensors). Furthermore, the control module 82 may control operation of the pumps 68, 80a, 80b, 80c, 80d and the valves 40, 42, 58, 60, 62, 64, 72, 78a, 78b, 78c, 78d based on an operating mode of the system 10. For example, the system 10 may be operable in a performance mode (in which vehicle handling is maximized) and in an economy mode (in which the vehicle still handles well, but the system 10 consumes less power). In some embodiments, the user may select the performance mode or the economy mode (e.g., using buttons, dials, and/or switches located within the occupant cabin of the vehicle). In some configurations, the control module 82 may automatically select the performance mode or the economy mode based on one or more vehicle operating parameters or conditions, such as a current driving speed, engine speed, and/or accelerometer data, for example. As another example, in hybrid vehicles (i.e., vehicles driven by a combustion engine and an electric motor), the control module 82 may operate the system 10 in the performance mode while the combustion engine is propelling the vehicle and in the economy mode while the electric motor is propelling the vehicle.

Figure 2:
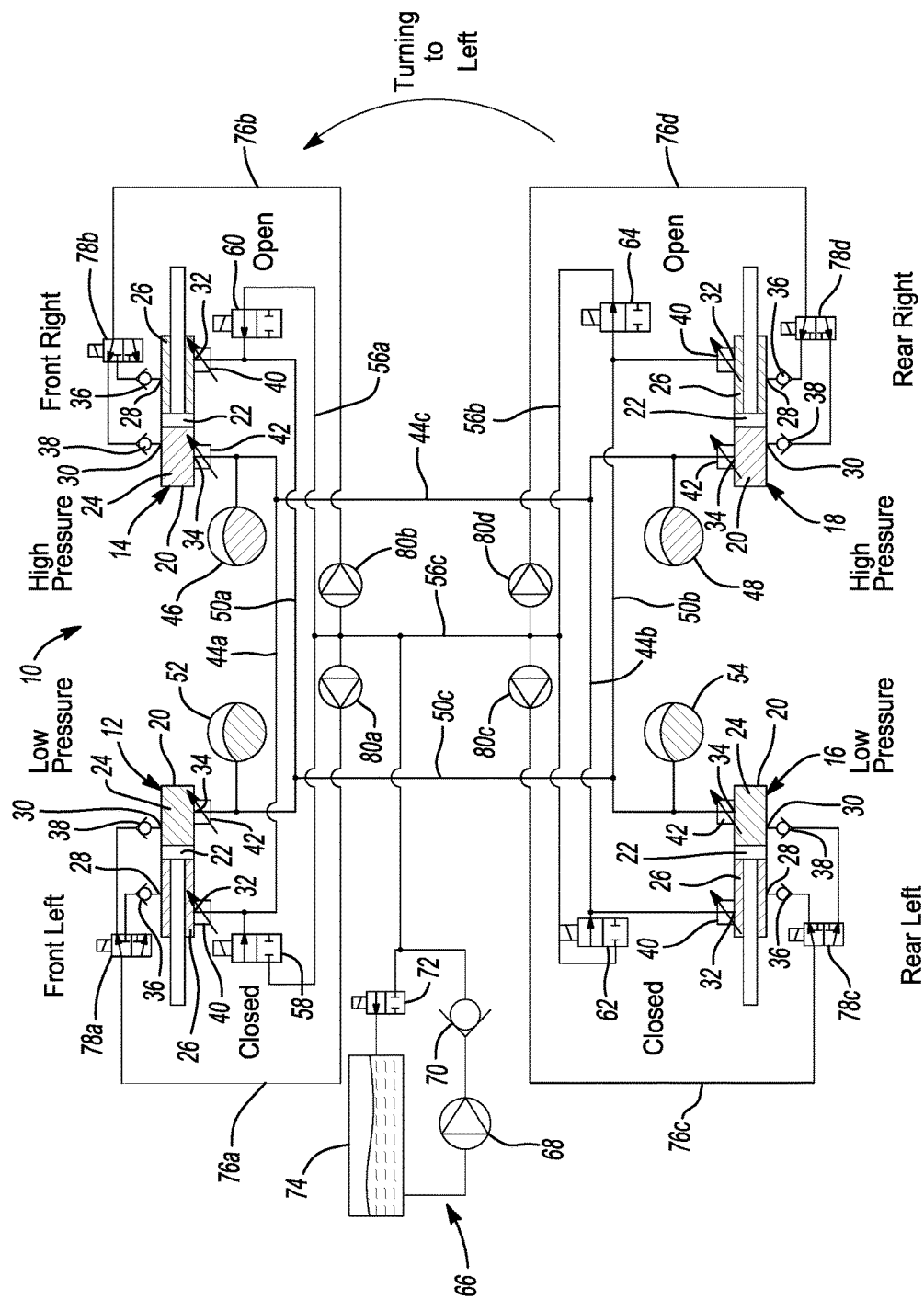
FIG. 2 is a schematic representation of the suspension system in the performance mode while the vehicle is turning left.
Figure 3:
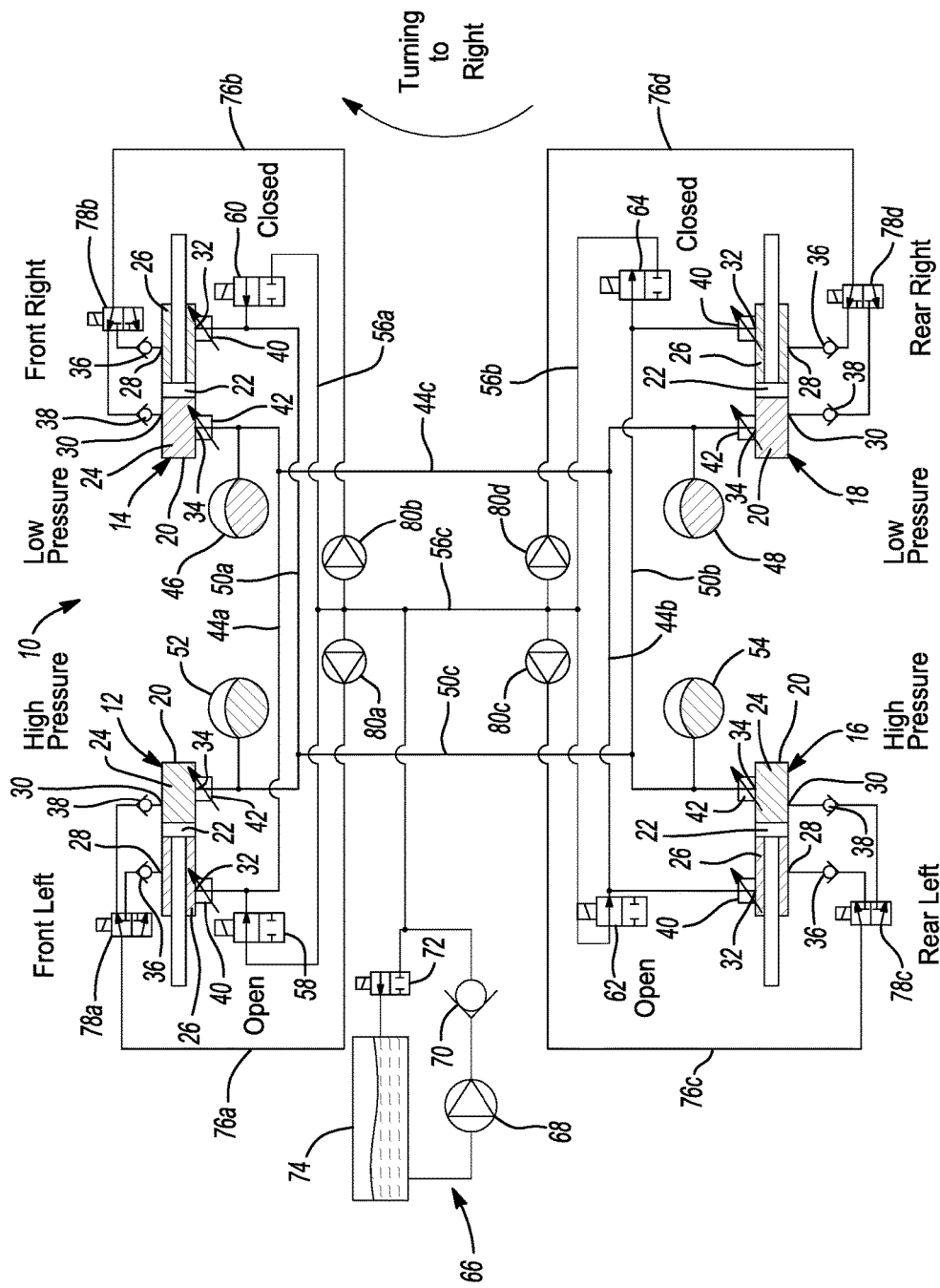
FIG. 3 is a schematic representation of the suspension system in the performance mode while the vehicle is turning right.

Referring now to FIGS. 1-3, operation of the system 10 in the performance mode will be described. In the performance mode, the control module 82 may operate the pumps 80a, 80b, 80c, 80d intermittently or continuously to provide active fluid flow to one of the chambers 24, 26 of the actuators 12, 14, 16, 18. FIG. 1 depicts the system 10 operating in the performance mode while the vehicle is driving in a straight (or approximately straight) line. During straight line driving, the control module 82 may open the comfort valves 58, 60, 62, 64 (or keep the comfort valves 58, 60, 62, 64 in an open position) to allow fluid communication among the chambers 24, 26 of the actuators 12, 14, 16, 18, allow fluid communication among the conduits 56a, 44a, 50a, and allow fluid communication among the conduits 56b, 44b, 50b. The control valves 40, 42 can control fluid flow through the ports 32, 34 based on forces applied to the wheels of the vehicle (e.g., from bumps in the road upon which the vehicle is driving). That is, the control valves 40, 42 control fluid flow through the ports 32, 34 to absorb shocks from bumps in the road in a manner that improves comfort for vehicle occupants.

FIG. 2 depicts the system 10 operating in the performance mode while the vehicle is driving forward and cornering or turning to the left. While driving forwarding and turning to the left, the front-right and rear-right actuators 14, 18 will go into a compression stroke (i.e., the pistons 22 of the front-right and rear-right actuators 14, 18 move within the cylinders 20 in a direction that decreases the volume of the compression chambers 24 of the front-right and rear-right actuators 14, 18) and the front-left and rear-left actuators 12, 16 will go into a rebound stroke (i.e., the pistons 22 of the front-left and rear-left actuators 12, 16 move within the cylinders 20 in a direction that decreases the volume of the rebound chambers 26 of the front-left and rear-left actuators 12, 16). Fluid pressure in the accumulators 46, 48 (i.e., accumulators corresponding to the front-right and rear-right actuators 14, 18) will increase while fluid pressure in the accumulators 52, 54 (i.e., accumulators corresponding to the front-left and rear-left actuators 12, 16) will decrease.

Furthermore, while the vehicle is turning to the left, the control module 82 will open (or keep open) the comfort valves 60, 64 corresponding to the front-right and rear-right actuators 14, 18 and close (or keep closed) the comfort valves 58, 62 corresponding to the front-left and rear-left actuators 12, 16. Additionally, the control module 82 will connect the left-side switch valves 78a, 78c with the rebound chambers 26 of the front-left and rear-left actuators 12, 16 (i.e., the left-side switch valves 78a, 78c will provide fluid communication between the conduits 76a, 76c with the rebound chambers 26 of the front-left and rear-left actuators 12, 16), and the control module 82 will connect the right-side switch valves 78b, 78d with the compression chambers 24 of the front-right and rear-right actuators 14, 18 (i.e., the right-side switch valves 78b, 78d will provide fluid communication between the conduits 76b, 76d with the compression chambers 24 of the front-right and rear-right actuators 14, 18). In this manner, the pumps 80a, 80b, 80c, 80d can pump hydraulic fluid from the left-side accumulators 52, 54 to the right-side accumulators 46, 48 to increase the fluid pressure in the right-side accumulators 46, 48 to actively counteract the roll force associated with the left turn of the vehicle. Once the control module 82 determines that the correct roll angle is obtained, the control module 82 can close the fluid connection between the switch valves 78a, 78b, 78c, 78d and their respective actuators 12, 14, 16, 18 and allow the pumps 80a, 80b, 80c, 80d to run idle.

FIG. 3 depicts the system 10 operating in the performance mode while the vehicle is driving forward and cornering or turning to the right. While driving forwarding and turning to the right, the front-left and rear-left actuators 12, 16 will go into a compression stroke (i.e., the pistons 22 of the front-left and rear-left actuators 12, 16 move within the cylinders 20 in a direction that decreases the volume of the compression chambers 24 of the front-left and rear-left actuators 12, 16) and the front-right and rear-right actuators 14, 18 will go into a rebound stroke (i.e., the pistons 22 of the front-right and rear-right actuators 14, 18 move within the cylinders 20 in a direction that decreases the volume of the rebound chambers 26 of the front-right and rear-right actuators 14, 18). Fluid pressure in the accumulators 52, 54 (i.e., accumulators corresponding to the front-left and rear-left actuators 12, 16) will increase while fluid pressure in the accumulators 46, 48 (i.e., accumulators corresponding to the front-right and rear-right actuators 14, 18) will decrease.

Furthermore, while the vehicle is turning to the right, the control module 82 will open (or keep open) the comfort valves 58, 62 corresponding to the front-left and rear-left actuators 12, 16 and close (or keep closed) the comfort valves 60, 64 corresponding to the front-right and rear-right actuators 14, 18. Additionally, the control module 82 will connect the right-side switch valves 78b, 78d with the rebound chambers 26 of the front-right and rear-right actuators 14, 18 (i.e., the right-side switch valves 78*b*, 78*d* will provide fluid communication between the conduits 76*b*, 76*d* with the rebound chambers 26 of the front-right and rear-right actuators 14, 18), and the control module 82 will connect the left-side switch valves 78*a*, 78*c* with the compression chambers 24 of the front-left and rear-left actuators 12, 16 (i.e., the left-side switch valves 78*a*, 78*c* will provide fluid communication between the conduits 76*a*, 76*c* with the compression chambers 24 of the front-left and rear-left actuators 12, 16). In this manner, the pumps 80*a*, 80*b*, 80*c*, 80*d* can pump hydraulic fluid from the right-side accumulators 46, 48 to the left-side accumulators 52, 54 to increase the fluid pressure in the left-side accumulators 52, 54 to actively counteract the roll force associated with the right turn of the vehicle. Once the control module 82 determines that the correct roll angle is obtained, the control module 82 can close the fluid connection between the switch valves 78*a*, 78*b*, 78*c*, 78*d* and their respective actuators 12, 14, 16, 18 and allow the pumps 80*a*, 80*b*, 80*c*, 80*d* to run idle.

Figure 4:
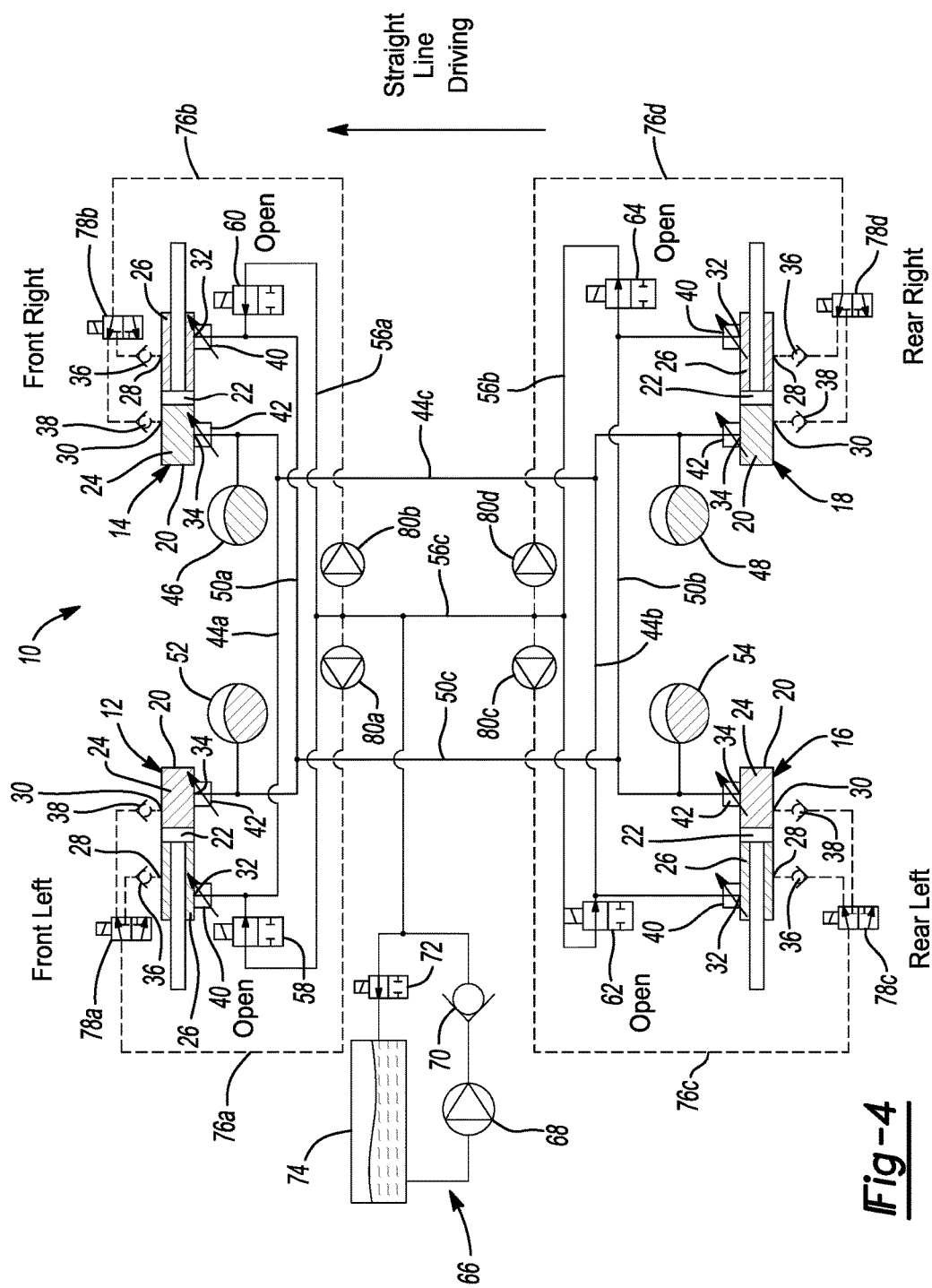
FIG. 4 is a schematic representation of the suspension system in an economy mode while the vehicle is driving straight.
Figure 5:
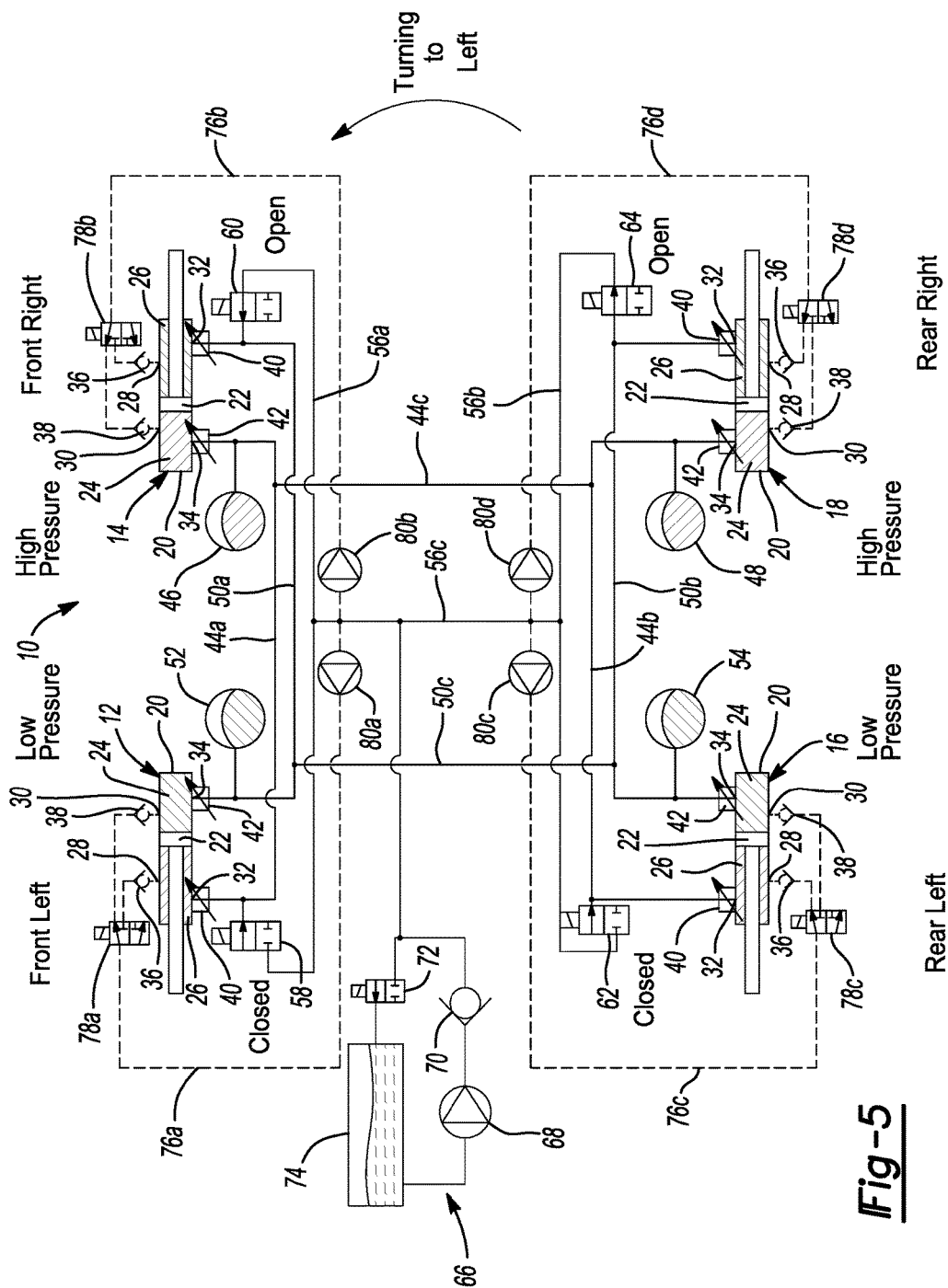
FIG. 5 is a schematic representation of the suspension system in the economy mode while the vehicle is turning left.
Figure 6:
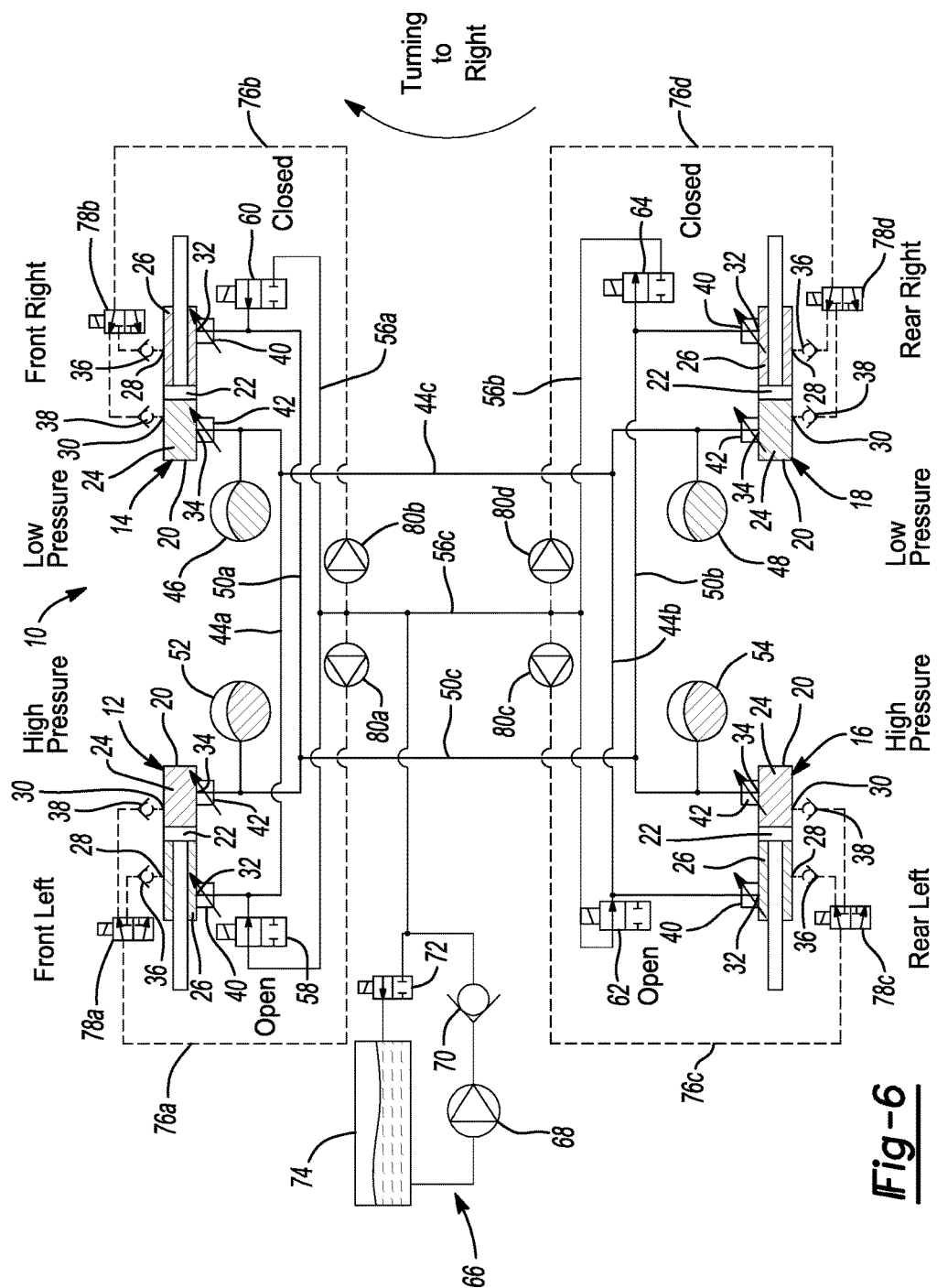
FIG. 6 is a schematic representation of the suspension system in the economy mode while the vehicle is turning right.
Figure 7:
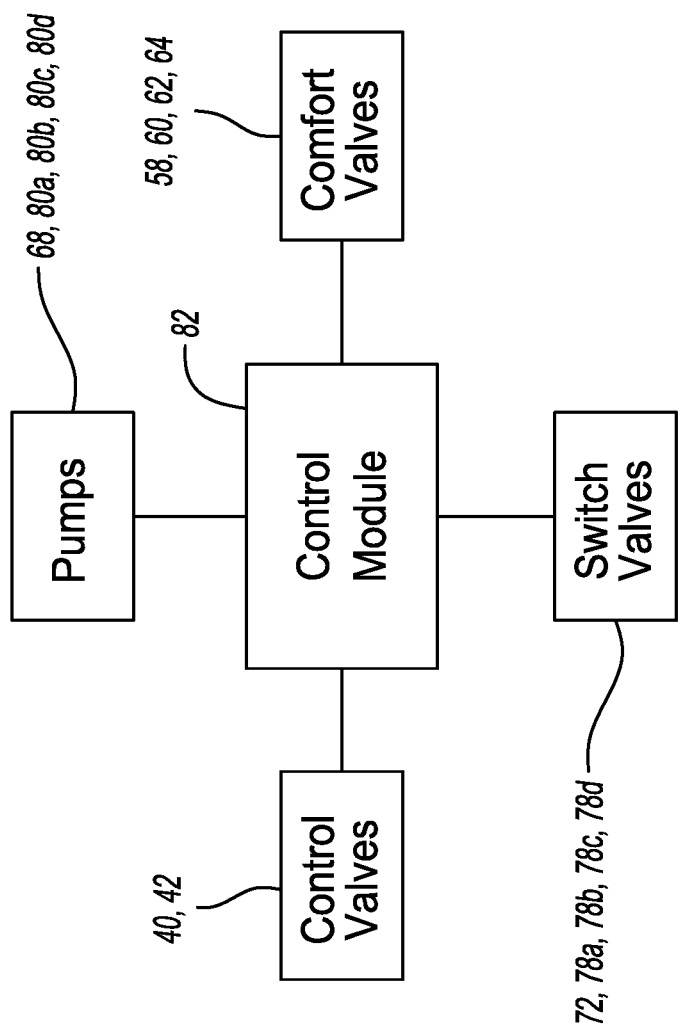
FIG. 7 is a schematic representation of a control module in communication with pumps and valves of the suspension system.

Referring now to FIGS. 4-6, operation of the system 10 in the economy mode will be described. In the economy mode, the control module 82 may shut down the pumps 80*a*, 80*b*, 80*c*, 80*d* to reduce energy consumption of the system 10. FIG. 4 depicts the system 10 operating in the economy mode while the vehicle is driving in a straight (or approximately straight) line. During straight line driving, the control module 82 may open the comfort valves 58, 60, 62, 64 (or keep the comfort valves 58, 60, 62, 64 in the open position) to allow fluid communication among the chambers 24, 26 of the actuators 12, 14, 16, 18, allow fluid communication among the conduits 56*a*, 44*a*, 50*a*, and allow fluid communication among the conduits 56*b*, 44*b*, 50*b*. The control valves 40, 42 can control fluid flow through the ports 32, 34 based on forces applied to the wheels of the vehicle (e.g., from bumps in the road upon which the vehicle is driving). That is, the control valves 40, 42 control fluid flow through the ports 32, 34 to absorb shocks from bumps in the road in a manner that improves comfort for vehicle occupants.

FIG. 5 depicts the system 10 operating in the economy mode while the vehicle is driving forward and cornering or turning to the left. Operation of the system 10 in the economy mode while the vehicle is turning left may be substantially similar or identical to operation of the system 10 in the performance mode while the vehicle is turning left, except that in the economy mode, the pumps 80*a*, 80*b*, 80*c*, 80*d* are shut down.

FIG. 6 depicts the system 10 operating in the economy mode while the vehicle is driving forward and cornering or turning to the right. Operation of the system 10 in the economy mode while the vehicle is turning right may be substantially similar or identical to operation of the system 10 in the performance mode while the vehicle is turning right, except that in the economy mode, the pumps 80*a*, 80*b*, 80*c*, 80*d* are shut down, as described above.

Figure 8:
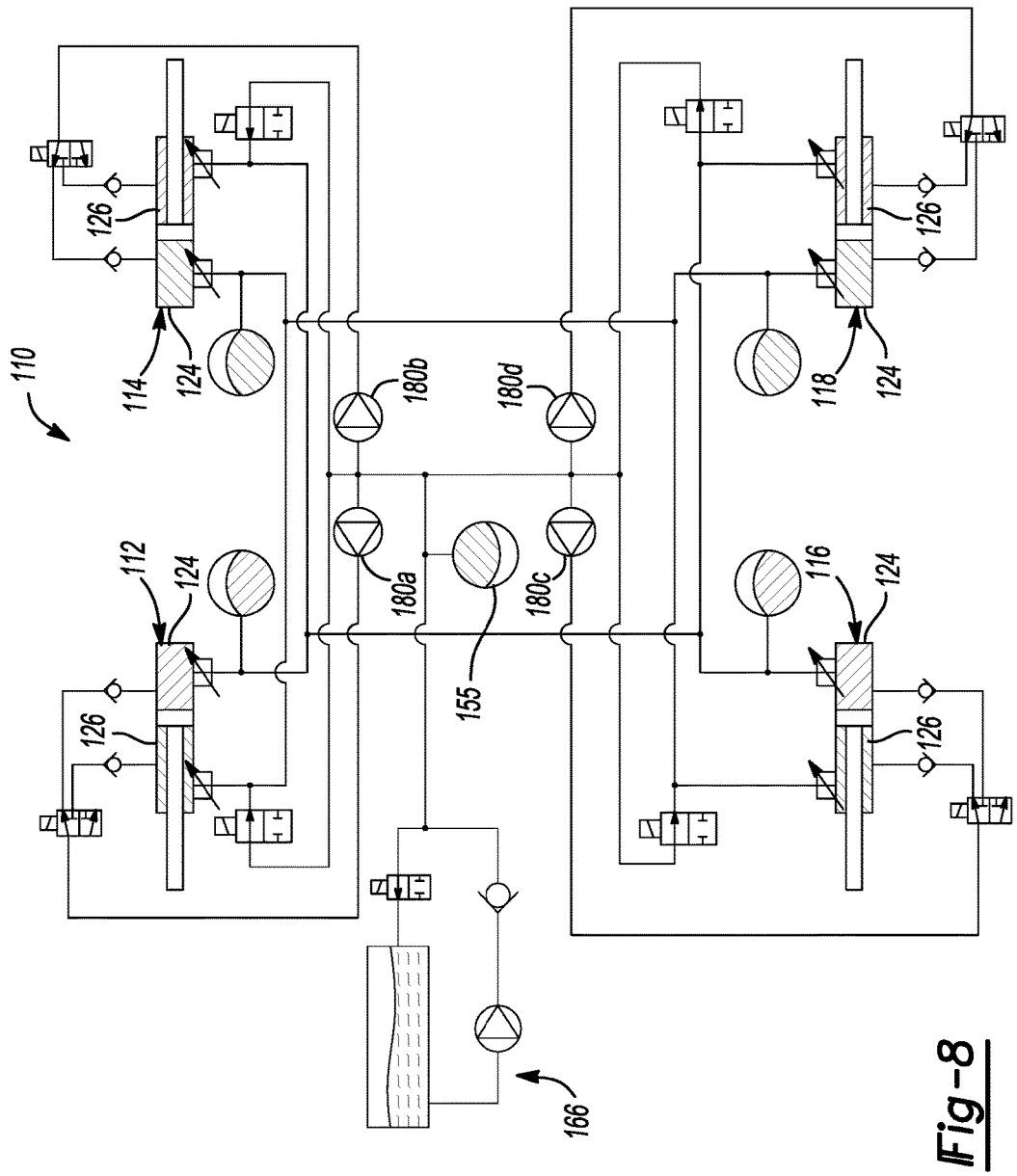
FIG. 8 is a schematic representation of another suspension system.

With reference to FIG. 8, another suspension system 110 is provided. The structure and function of the system 110 may be similar or identical to that of the system 10 described above. Therefore, similar features will not be described again in detail. The system 110 may also include an additional buffer accumulator 155. The buffer accumulator 155 can be disposed at a location on a low-pressure side of the hydraulic circuit, such as along a conduit downstream of APMU 166 and upstream of pumps 180*a*, 180*b*, 180*c*, 180*d*. The buffer accumulator 155 may contain a volume of hydraulic fluid from which the pumps 180*a*, 180*b*, 180*c*, 180*d* can draw and pump to chambers 124, 126 of the actuators 112, 114, 116, 118. The APMU 166 can be similar or identical to any configuration of the APMU 66 described above.

Figure 9:
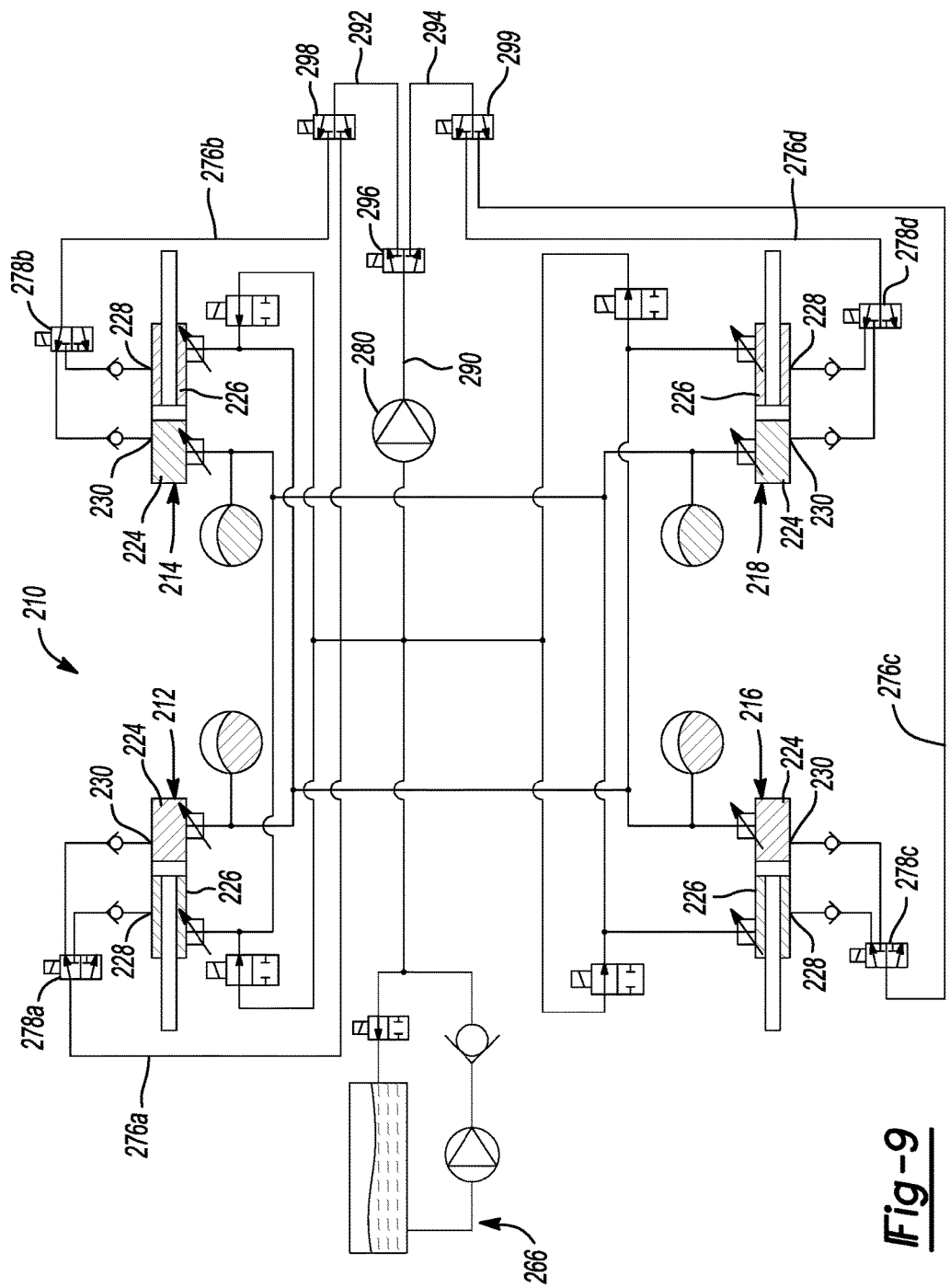
FIG. 9 is a schematic representation of yet another suspension system.

With reference to FIG. 9, another suspension system 210 is provided. The structure and function of the system 210 may be similar or identical to that of either of the systems 10, 110 described above, apart from exceptions described below. Therefore, similar features will not be described again in detail.

Like the systems 10, 110, the system 210 may include conduits 276*a*, 276*b*, 276*c*, 276*d* that are in selective fluid communication with compression and rebound chambers 224, 226 of actuators 212, 214, 216, 218 via ports 228, 230. Each conduit 276*a*, 276*b*, 276*c*, 276*d* may include a respective switch valve 278*a*, 278*b*, 278*c*, 278*d*. Each switch valve 278*a*, 278*b*, 278*c*, 278*d* is fluidly coupled to the first and second ports 228, 230 of a respective one of the actuators 212, 214, 216, 218. The structure and function of the switch valves 278*a*, 278*b*, 278*c*, 278*d* may be similar or identical to that of the switch valves 78*a*, 78*b*, 78*c*, 78*d* described above.

While the systems 10, 110 are described above as having four pumps 80*a*, 80*b*, 80*c*, 80*d*, the system 210 may have a single pump 280 that replaces the pumps 80*a*, 80*b*, 80*c*, 80*d*. The pump 280 may be driven by its own electric motor or by a belt or chain driven by an engine or powertrain of the vehicle.

The pump 280 may draw hydraulic fluid from APMU 266 and pump the hydraulic fluid through a first supply conduit 290. The APMU 266 can be similar or identical to any configuration of the APMU 66 described above. The first supply conduit 290 may be fluidly connected to a second supply conduit 292 and a third supply conduit 294 by a switch valve 296. The switch valve 296 may be movable between a first position allowing fluid communication between the first supply conduit 290 and the second supply conduit 292 and preventing fluid communication between the first supply conduit 290 and the third supply conduit 294, a second position allowing fluid communication between the first supply conduit 290 and the third supply conduit 294 and preventing fluid communication between the first supply conduit 290 and the second supply conduit 292, and a third position allowing the first supply conduit 290 to fluidly communicate with both of the second and third supply conduits 292, 294.

The second supply conduit 292 may be fluidly connected to the conduits 276*a*, 276*b* by a switch valve 298. The switch valve 298 may be movable between a first position allowing fluid communication between the second supply conduit 292 and the conduit 276*a* and preventing fluid communication between the second supply conduit 292 and the conduit 276*b*, a second position allowing fluid communication between the second supply conduit 292 and the conduit 276*b* and preventing fluid communication between the second supply conduit 292 and the conduit 276*a*, and a third position allowing the second supply conduit 292 to fluidly communicate with both of the conduits 276*a*, 276*b*.

The third supply conduit 294 may be fluidly connected to the conduits 276*c*, 276*d* by a switch valve 299. The switch valve 299 may be movable between a first position allowing fluid communication between the third supply conduit 294 and the conduit 276*c* and preventing fluid communication between the third supply conduit 294 and the conduit 276*d*, a second position allowing fluid communication between the third supply conduit 294 and the conduit 276*d* and preventing fluid communication between the third supply conduit 294 and the conduit 276c, and a third position allowing the third supply conduit 294 to fluidly communicate with both of the conduits 276c, 276d.

As described above, the control module 82 may operate the pump 280 in the performance mode. The control module 82 may control the switch valves 296, 298, 299 to regulate the flow of hydraulic fluid from the pump 280 to the appropriate one or more of the actuators 212, 214, 216, 218.

Figure 10:
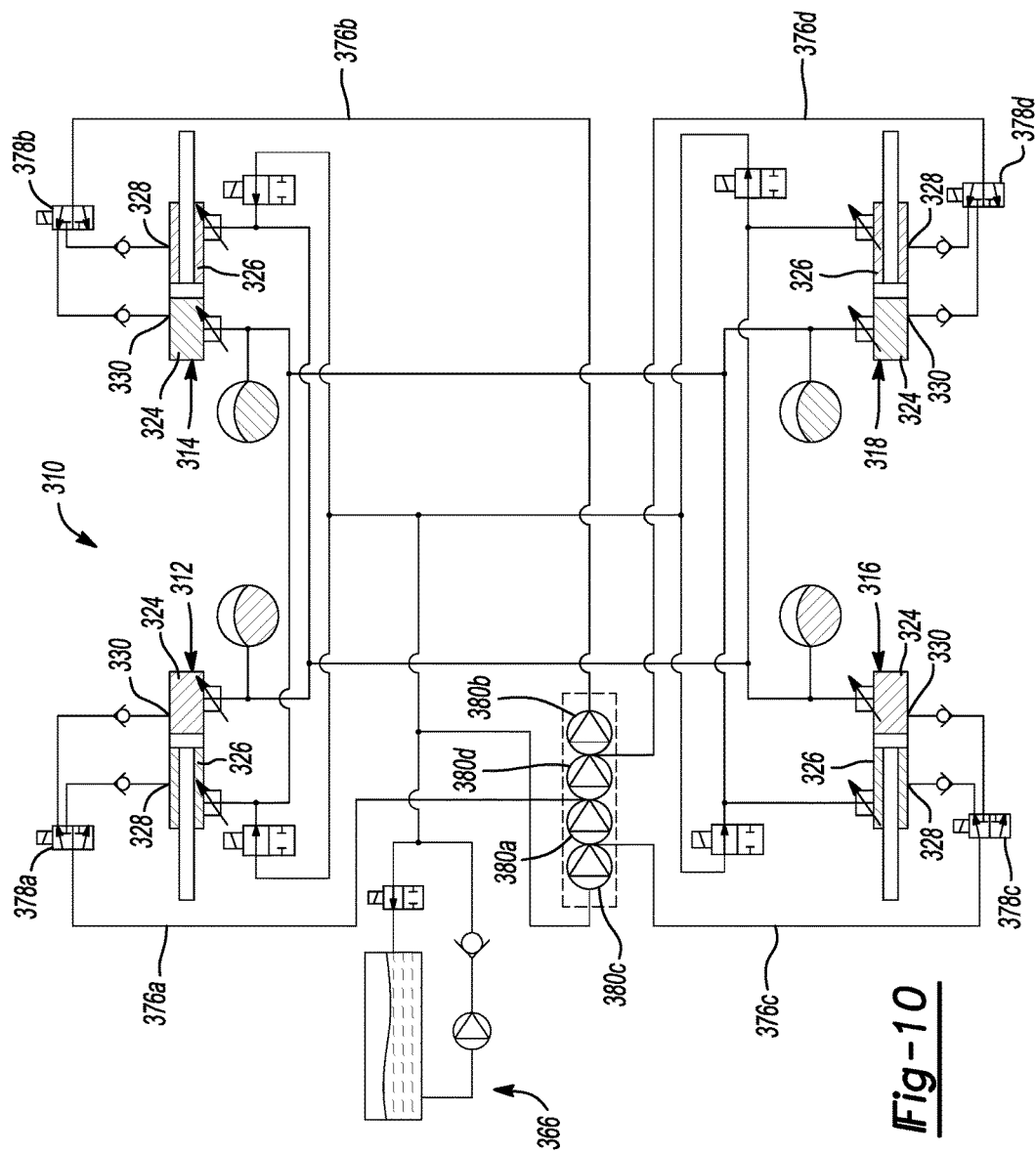
FIG. 10 is a schematic representation of yet another suspension system.

With reference to FIG. 10, another suspension system 310 is provided. The structure and function of the system 310 may be similar or identical to that of either of the systems 10, 110 described above, apart from exceptions described below. Therefore, similar features will not be described again in detail.

Like the systems 10, 110, the system 310 may include conduits 376a, 376b, 376c, 376d that are in selective fluid communication with compression and rebound chambers 324, 326 of actuators 312, 314, 316, 318 via ports 328, 330. Each conduit 376a, 376b, 376c, 376d may include a respective switch valve 378a, 378b, 378c, 378d. Each switch valve 378a, 378b, 378c, 378d is fluidly coupled to the first and second ports 328, 330 of a respective one of the actuators 312, 314, 316, 318. The structure and function of the switch valves 378a, 378b, 378c, 378d may be similar or identical to that of the switch valves 78a, 78b, 78c, 78d described above.

Furthermore, like the systems 10, 110, the system 310 may include four pumps 380a, 380b, 380c, 380d. Each of the pumps 380a, 380b, 380c, 380d pumps hydraulic fluid from APMU 366 through a respective one of the conduits 376a, 376b, 376c, 376d. The APMU 366 can be similar or identical to any configuration of the APMU 66 described above. The pumps 380a, 380b, 380c, 380d may be arranged in series such that a common drive shaft drives the pumping mechanism of all of the pumps 380a, 380b, 380c, 380d. The common drive shaft could be driven by a single, dedicated electric motor or by a belt that is driven by an engine or powertrain of the vehicle.

Figure 11:
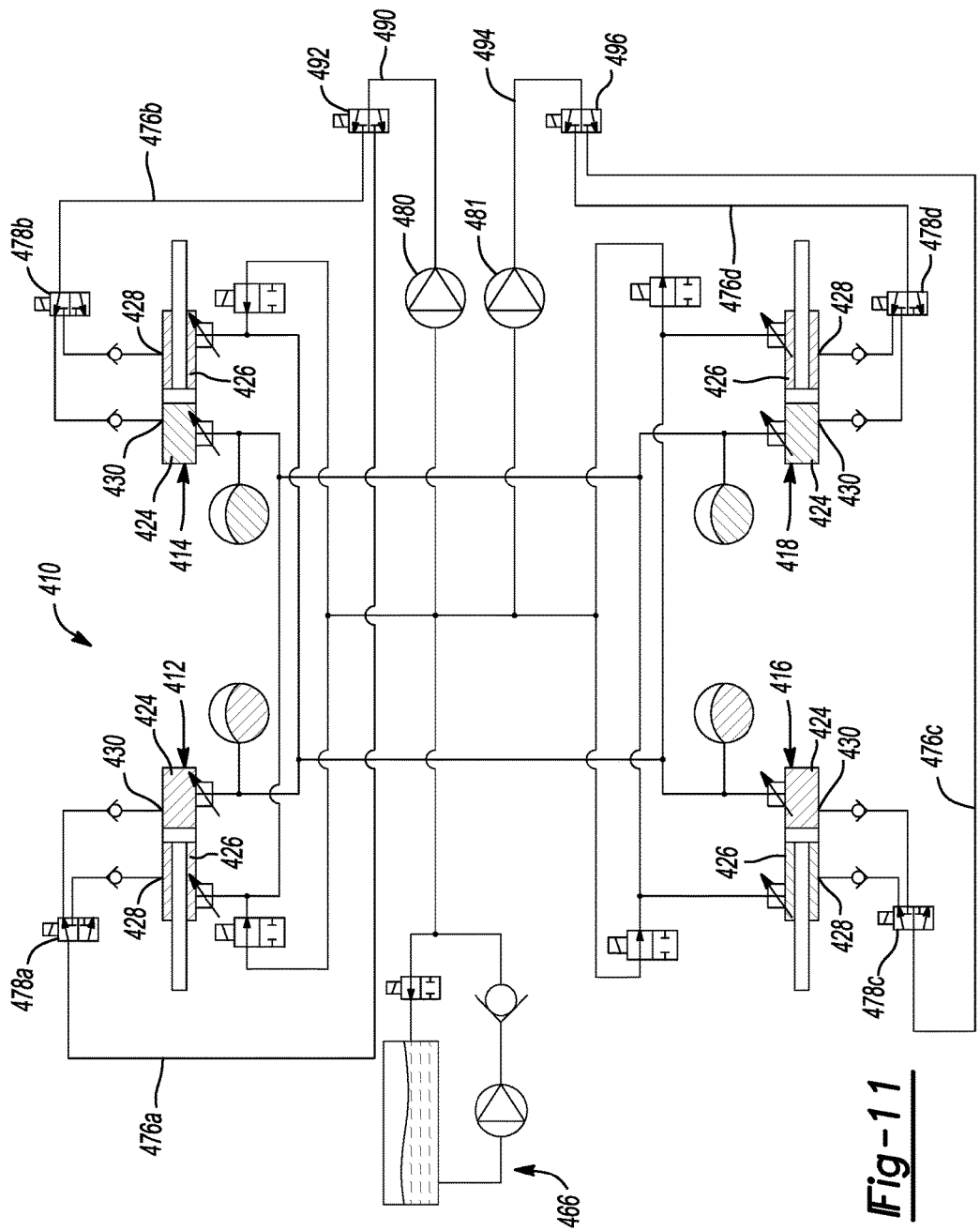
FIG. 11 is a schematic representation of yet another suspension system.

With reference to FIG. 11, another suspension system 410 is provided. The structure and function of the system 410 may be similar or identical to that of either of the systems 10, 110 described above, apart from exceptions described below. Therefore, similar features will not be described again in detail.

Like the systems 10, 110, the system 410 may include conduits 476a, 476b, 476c, 476d that are in selective fluid communication with compression and rebound chambers 424, 426 of actuators 412, 414, 416, 418 via ports 428, 430. Each conduit 476a, 476b, 476c, 476d may include a respective switch valve 478a, 478b, 478c, 478d. Each switch valve 478a, 478b, 478c, 478d is fluidly coupled to the first and second ports 428, 430 of a respective one of the actuators 412, 414, 416, 418. The structure and function of the switch valves 478a, 478b, 478c, 478d may be similar or identical to that of the switch valves 78a, 78b, 78c, 78d described above.

While the systems 10, 110 are described above as having four pumps 80a, 80b, 80c, 80d, the system 410 may have a first pump 480 and a second pump 481 that replace the pumps 80a, 80b, 80c, 80d. The pumps 480, 481 may be driven by their own electric motors or by belts or chains driven by an engine or powertrain of the vehicle. The first pump 480 may correspond to the front axle of the vehicle, and the second pump 481 may correspond to the rear axle of the vehicle. That is, the first pump 480 may provide hydraulic fluid to the front actuators 412, 414, and the second pump 481 may provide hydraulic fluid to the rear actuators 416, 418.

The first pump 480 may draw hydraulic fluid from APMU 466 and pump the hydraulic fluid through a first supply conduit 490. The APMU 466 can be similar or identical to any configuration of the APMU 66 described above. The first supply conduit 490 may be fluidly connected to conduits 476a, 476b by a switch valve 492. The switch valve 492 may be movable between a first position allowing fluid communication between the first supply conduit 490 and the conduit 476a and preventing fluid communication between the first supply conduit 490 and the conduit 476b, a second position allowing fluid communication between the first supply conduit 490 and the conduit 476b and preventing fluid communication between the first supply conduit 490 and the conduit 476a, and a third position allowing the first supply conduit 490 to fluidly communicate with both of the conduits 476a, 476b.

The second pump 481 may draw hydraulic fluid from APMU 466 and pump the hydraulic fluid through a second supply conduit 494. The second supply conduit 494 may be fluidly connected to conduits 476c, 476d by a switch valve 496. The switch valve 496 may be movable between a first position allowing fluid communication between the second supply conduit 494 and the conduit 476c and preventing fluid communication between the second supply conduit 494 and the conduit 476d, a second position allowing fluid communication between the second supply conduit 494 and the conduit 476d and preventing fluid communication between the second supply conduit 494 and the conduit 476c, and a third position allowing the second supply conduit 494 to fluidly communicate with both of the conduits 476c, 476d.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The descriptions and figures above may serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle suspension system comprising:
   a plurality of hydraulic actuators each including a cylinder and a piston movable within the cylinder, the piston dividing an interior of the cylinder into a compression chamber and a rebound chamber, the compression and rebound chambers containing hydraulic fluid, wherein each of the cylinders includes a first port, a second port, a third port, and a fourth port, wherein the first and third ports are openings to the rebound chamber, and wherein the second and fourth ports are openings to the compression chamber;
   a first conduit fluidly connecting the third port of a first one of the plurality of hydraulic actuators with the fourth port of a second one of the plurality of hydraulic actuators;
   a second conduit fluidly connecting the third port of the second one of the plurality of hydraulic actuators with the fourth port of the first one of the plurality of hydraulic actuators;
   a third conduit extending from the first conduit to the second conduit and in selective fluid communication with the first and second conduits;
   a first valve connected to the first and third conduits and movable between an open position allowing fluid communication between the first and third conduits and a closed position restricting fluid communication between the first and third conduits;
   a second valve connected to the second and third conduits and movable between an open position allowing fluid communication between the second and third conduits and a closed position restricting fluid communication between the second and third conduits; and
   a third valve connected to the first and second ports of the first one of the plurality of hydraulic actuators and movable between a first position allowing fluid flow into the first port of the first one of the plurality of hydraulic actuators and a second position allowing fluid flow into the second port of the first one of the plurality of hydraulic actuators.

2. The vehicle suspension system of claim 1, further comprising a pump in fluid communication with the third valve and pumping hydraulic fluid through the third valve to a selected one of the first and second ports of the first one of the plurality of hydraulic actuators.

3. The vehicle suspension system of claim 2, further comprising a control module in communication with the pump and operable in a performance mode and in an economy mode, wherein the control module operates the pump in the performance mode and shuts down the pump in the economy mode.

4. The vehicle suspension system of claim 2, further comprising a pressure maintenance unit providing hydraulic fluid to the pump and to the third conduit, the pressure maintenance unit including a reservoir containing hydraulic fluid and another pump pumping hydraulic fluid from the reservoir.

5. The vehicle suspension system of claim 2, further comprising a fourth valve connected to the first and second ports of the second one of the plurality of hydraulic actuators and movable between a first position allowing fluid flow into the first port of the second one of the plurality of hydraulic actuators and a second position allowing fluid flow into the second port of the second one of the plurality of hydraulic actuators.

6. The vehicle suspension system of claim 5, wherein the pump is in fluid communication with the fourth valve and pumps hydraulic fluid through the fourth valve to a selected one of the first and second ports of the second one of the plurality of hydraulic actuators.

7. The vehicle suspension system of claim 5, further comprising another pump in fluid communication with the fourth valve and pumping hydraulic fluid through the fourth valve to a selected one of the first and second ports of the second one of the plurality of hydraulic actuators.

8. The vehicle suspension system of claim 1, further comprising a first accumulator in direct fluid communication with the first conduit.

9. The vehicle suspension system of claim 8, further comprising a second accumulator in direct fluid communication with the second conduit.

10. The vehicle suspension system of claim 9, further comprising a buffer accumulator in fluid communication with the third conduit.

11. The vehicle suspension system of claim 1, further comprising a control module in communication with the first and second valves,
wherein the control module opens the first valve and closes the second valve in response to a vehicle turn in a first direction, whereby the piston of the first one of the plurality of hydraulic actuators moves in a compression stroke and the piston of the second one of the plurality of hydraulic actuators moves in a rebound stroke, and
wherein the control module opens the second valve and closes the first valve in response to a vehicle turn in a second direction that is different than the first direction, whereby the piston of the first one of the plurality of hydraulic actuators moves in a rebound stroke and the piston of the second one of the plurality of hydraulic actuators moves in a compression stroke.

12. The vehicle suspension system of claim 11, wherein the control module opens the first and second valves during straight-line driving.

13. A vehicle suspension system comprising:
a plurality of hydraulic actuators each including a cylinder and a piston movable within the cylinder, the piston dividing an interior of the cylinder into a compression chamber and a rebound chamber, the compression and rebound chambers containing hydraulic fluid, wherein each of the cylinders includes a first port, a second port, a third port, and a fourth port, wherein the first and third ports are openings to the rebound chamber, and wherein the second and fourth ports are openings to the compression chamber;
a first conduit fluidly connecting the third port of a first one of the plurality of hydraulic actuators with the fourth port of a second one of the plurality of hydraulic actuators;
a second conduit fluidly connecting the third port of the second one of the plurality of hydraulic actuators with the fourth port of the first one of the plurality of hydraulic actuators;
a first switch valve connected to the first and second ports of the first one of the plurality of hydraulic actuators and movable between a first position allowing fluid flow into the first port of the first one of the plurality of hydraulic actuators and a second position allowing fluid flow into the second port of the first one of the plurality of hydraulic actuators; and
a second switch valve connected to the first and second ports of the second one of the plurality of hydraulic actuators and movable between a first position allowing fluid flow into the first port of the second one of the plurality of hydraulic actuators and a second position allowing fluid flow into the second port of the second one of the plurality of hydraulic actuators.

14. The vehicle suspension system of claim 13, further comprising a pump in fluid communication with the first switch valve and pumping hydraulic fluid through the first switch valve to a selected one of the first and second ports of the first one of the plurality of hydraulic actuators.

15. The vehicle suspension system of claim 14, further comprising a control module in communication with the pump and operable in a performance mode and in an economy mode, wherein the control module operates the pump in the performance mode and shuts down the pump in the economy mode.

16. The vehicle suspension system of claim 15, further comprising:
a first accumulator in direct fluid communication with the first conduit; and
a second accumulator in direct fluid communication with the second conduit.

17. The vehicle suspension system of claim 16, further comprising a third conduit extending from the first conduit to the second conduit and in selective fluid communication with the first and second conduits.

18. The vehicle suspension system of claim 17, further comprising a buffer accumulator in fluid communication with the third conduit and the pump.

19. The vehicle suspension system of claim 14, wherein the pump is in fluid communication with the second switch valve and pumps hydraulic fluid through the second switch valve to a selected one of the first and second ports of the second one of the plurality of hydraulic actuators.

20. The vehicle suspension system of claim 14, further comprising another pump in fluid communication with the second switch valve and pumping hydraulic fluid through the second switch valve to a selected one of the first and second ports of the second one of the plurality of hydraulic actuators.

* * * * *